United States Patent [19]
Barnhart

[11] 3,896,296
[45] July 22, 1975

[54] LIVE TIME CORRECTION SYSTEM

[75] Inventor: Morris W. Barnhart, Buffalo Grove, Ill.

[73] Assignee: Edax International Inc., Prarie View, Ill.

[22] Filed: Dec. 11, 1972

[21] Appl. No.: 313,777

[52] U.S. Cl. ........ 235/92 EV; 235/92 R; 235/92 PE; 235/92 PB; 235/92 MT
[51] Int. Cl. ............................................. G06m 3/14
[58] Field of Search .......... 235/92 T, 92 PE, 92 EV, 235/92 CT, 92 PB, 92 QC, 92 MT, 92 TF

[56] References Cited
UNITED STATES PATENTS

| | | | |
|---|---|---|---|
| 3,399,298 | 8/1968 | Taylor | 235/92 T |
| 3,441,719 | 4/1969 | Haller | 235/92 PE |
| 3,725,688 | 4/1973 | Brunson | 235/92 EV |

OTHER PUBLICATIONS

J. Harms, Automatic Dead–Time Correction for Multichannel Pulse–Height Analyzers at Variable Counting Rates, Nuclear Instruments and Methods, Vol. 53, (1967), pp. 192–196.

*Primary Examiner*—Gareth D. Shaw
*Assistant Examiner*—Robert F. Gnuse
*Attorney, Agent, or Firm*—James M. Wetzel

[57] ABSTRACT

This invention relates to a system including a pulse analyzer for analyzing a stream of input data pulses from a pulse source, wherein the analyzer requires a finite time period for the analysis of the input data pulses and provides an output pulse corresponding to the completion of each analysis, wherein the finite time period overlaps in real time one or more adjacent input data pulses so that during any given processing period there are a number of non-processed or "lost" input data pulses, and wherein the analyzer has a clock providing a real time correlation input to said analyzer. In this invention the clock is selectively stopped for periods of time corresponding to the analysis times for lost input pulses thereby to correct the time measured by the analyzer. Specifically, the clock is operated for a period of time and the number of non-processed input data pulses occurring during that period of time are counted. Then the clock is stopped while the analyzer continues to process input data pulses and provide output pulses corresponding to the counted number of non-processed input data pulses. Thereupon the clock is turned back on and the procedure repeated. This method accurately compensates for analysis dead time regardless of the pulse shape and under conditions of variable count rate and variable spectral distribution.

2 Claims, 9 Drawing Figures

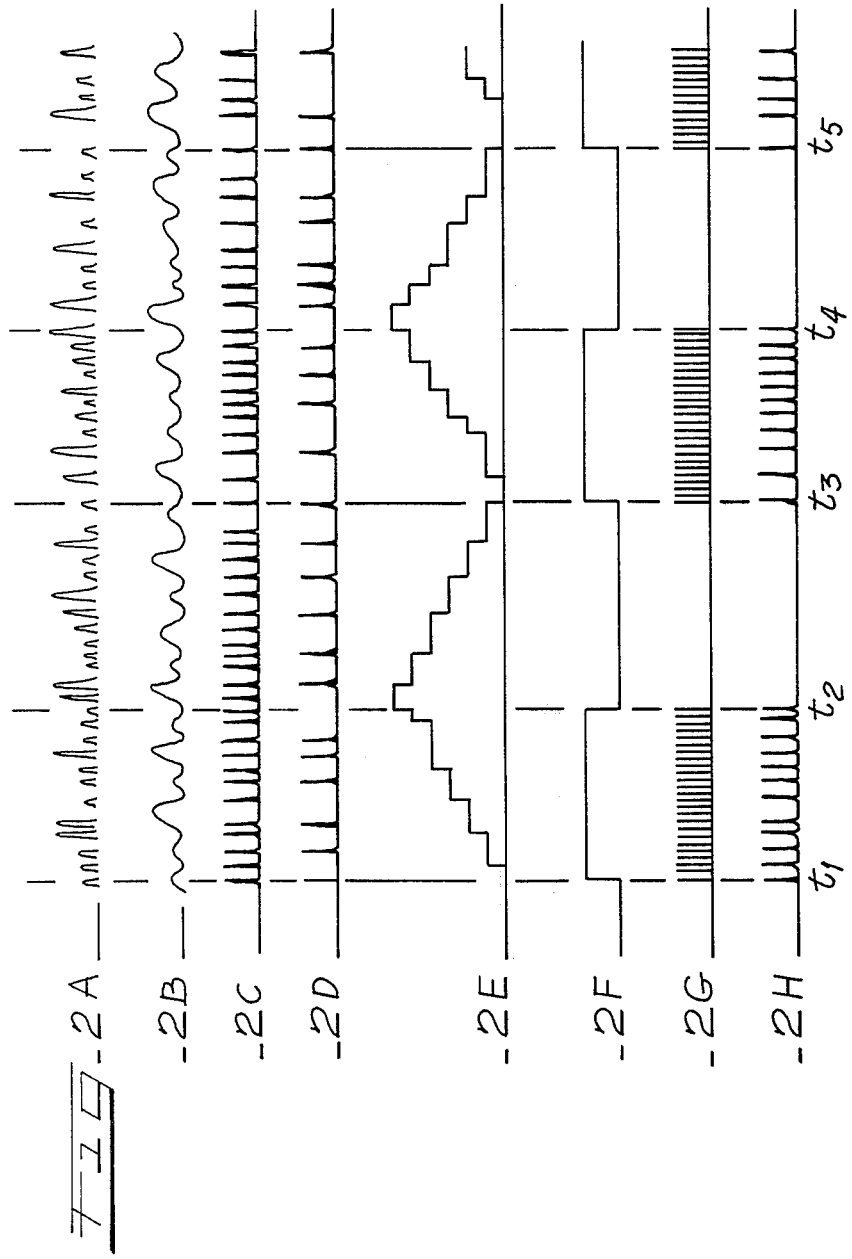

LIVE TIME CORRECTION SYSTEM

BACKGROUND OF THE INVENTION

This invention pertains to systems for quantitatively analyzing randomly occurring, variable height pulses and more particularly to a circuit for accurately determining the actual live time of the analysis system.

Variable height pulses are the output of elemental analysis systems, for example. One method of elemental analysis makes use of energy emitted from a change of state in the atom of a material sought to be analyzed. That change of state may be created by one of several means, the most common of which is bombardment of a material by an energy source, such as an electron beam or X-rays. The quantum of energy emitted because of such bombardment is unique to the element bombarded and thus the energy can be used to identify the elemental composition of the material. The quantum of energy for each element has its own band of spectral distribution and rate of accumulation, and as between differences in concentrations of the same element there may be comparative variations between spectral distribution and accumulation, or count, rates. As the time occurrence in which the energy is released or emitted is random, the measurement system used to ultimately identify the elemental composition must be capable of accounting for the random nature of the released energy as well as the variations in spectral distributions and count rates.

A typical measurement system for accomplishing the above task includes a solid state detector for detecting the random events caused by the bombardment, and a multi-channel analyzer which can accurately collect, sort and store energy events within a prescribed time period. Accurate quantitative analysis is dependent upon the collection and analysis of all events that may occur within a measured time period. However, the latter is difficult because the measurement system requires finite period of time to collect, analyze and store each event, during which time another energy event might take place, and not be collected. The alternatives are to either collect all events or compensate for events that occur but which are not collected. In the compensation approach the clock of the measuring system is selectively turned off as events are analyzed so that the analysis time is extended beyond the real clock time. This approach allows additional events to be analyzed in making up for those events that were lost due to the time that the system was making analysis on regularly occurring events.

Prior compensation systems have effected correction by gating off the measurement system clock during the analysis period for each event. Such an approach is useful for determining the percent of time that the system is performing the measurement of events and in compensating for that time but it is not accurate for performing precise quantitative analysis where the events are, as here, random, of varying spectral distribution and varying count rates during the analysis period. Actually, the only accurate way to determine the number of events missed during an analysis period is to count and accumulate the number of lost events.

SUMMARY OF THE INVENTION

It is the general object of the present invention to provide in an energy event analyzing system a means and rationale that accurately time compensates for events lost to the analyzer during processing periods.

A more specific object of the invention is to provide a circuit for turning off the time clock in the analyzer for selective periods corresponding to the number of events missed during the processing periods of the analyzer.

A detailed object of the invention is a clock control circuit for a multi-channel pulse height analyzer which includes an up-down counter register. The "up-count" input is from a signal source which produces a pulse for each energy occurrence and which is furnished to the analyzer. The "down-count" is a signal from the analyzer corresponding to the completion of the analysis of a pulse signal.

Thus in the analysis system of the present invention, upon detection of an energy event, a count is entered as an up-count in the register. As each event is analyzed by the multi-channel analyzer, and a storage for the event is effected in the analyzer, a count is subtracted from the count number in the register. Thus, at any specific time there is a positive number in the register which corresponds to the difference between the number of events that have occurred during a predetermined time interval and a number of those occurrences which have been analyzed by the multi-channel analyzer. When the register reaches its full capacity, it acts then to turn off the analyzer system clock, so that although the analyzer is still functioning, it is not recording the time as "real analyzer time." However, during this time period the register continues to receive a count for each event that is analyzed by the system which count effects a count-down of the register. This mode of operation continues until the register reaches zero, at which time the analyzer system clock is turned back on and the register again begins storing a number equal to the difference between the event occurrences and the event occurrence analysis. Thus the system works on the assumption that the data train of pulses during the count-down will be about the same as that during count-up, which assumption is generally valid for most analysis circumstances. The assumption has been found to be highly accurate when the count-up and count-down periods are made to be relatively short.

The invention will be better understood by reference to the drawings which make up a part of the specification and which include:

FIGS. 2A through 2H are illustrative of pulse occurrences within the circuit of FIG. 1 wherein:

FIG. 2A are the output pulses from the detector 30;

FIG. 2B is the output of the shaping amplifier 12;

FIG. 2C is the output of the discriminator 14;

FIG. 2D is the output from the multi-channel pulse height analyzer 40;

FIG. 2E represents the count stored in the counter register 22;

FIG. 2F represents the output from the flip-flop 26;

Figure 1:
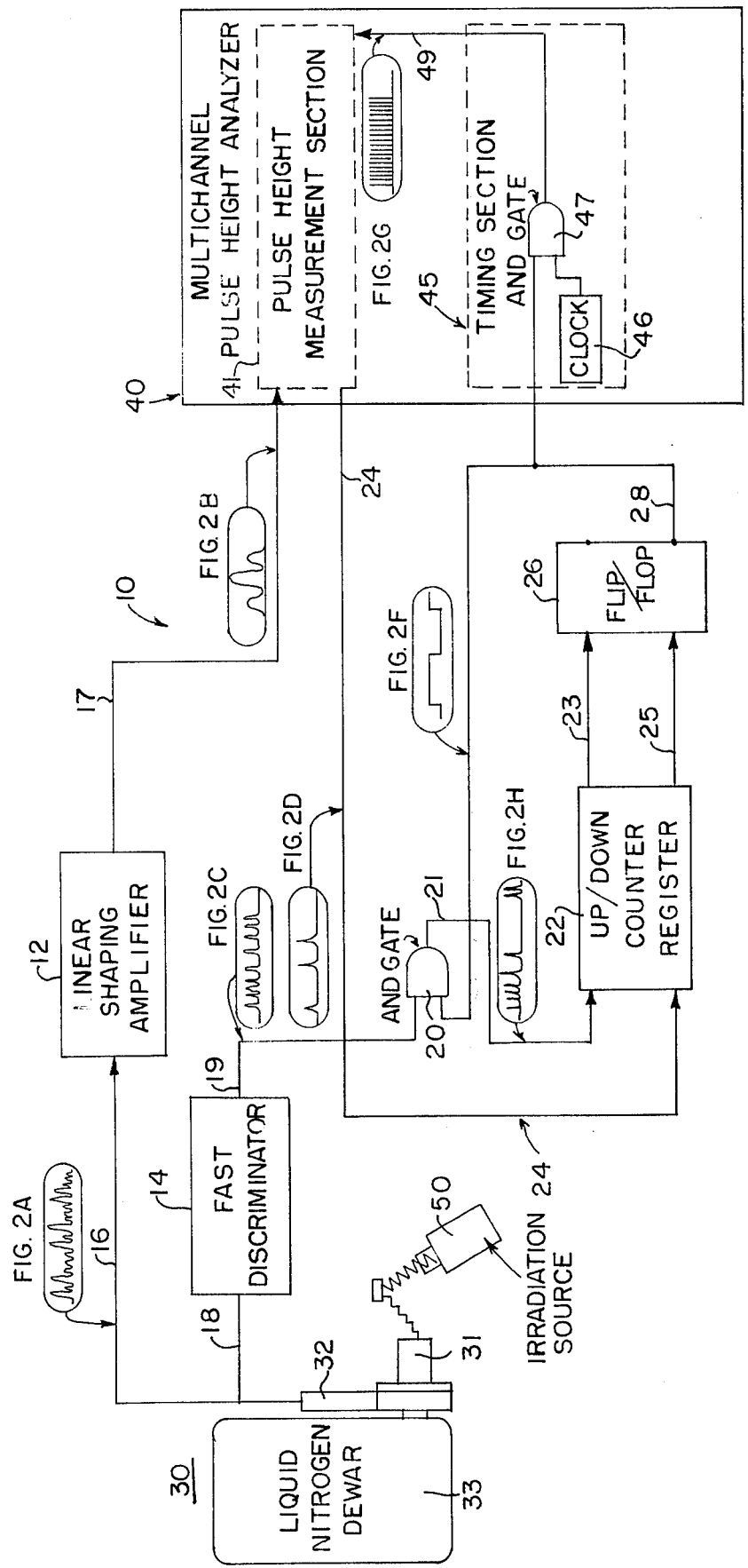
FIG. 1 is a block schematic diagram of the accurate live time correction system for quantitative elemental analysis, in accordance with the invention.

FIG. 2G represents the output of the timing section 45 in the multi-channel pulse height analyzer; and FIG. 2H represents those portions of the pulse of FIG. 2C which are applied through the gate 20 to the up-down register 22.

The invention will be better understood by reference to the drawings and description associated therewith.

DETAILED DESCRIPTION OF THE INVENTION

Referring to the drawings, and specifically to the schematic of FIG. 1, there is shown therein the live time correction system circuit 10, in accordance with the invention, interposed between a pulse source 30 and a multi-channel pulse height analyzer 40. The live time correction circuit 10 includes a discriminator 14 which receives via conductor 18 signals corresponding to pulses provided from the pulse source 30 and produces constant amplitude count pulses corresponding to the output from pulse source 30. The count pulses from the discriminator 14 are applied via the conductor 21 to an up/down counter register 22. The register is also provided with input pulses via conductor 24 from the multi-channel pulse height analyzer 40. The up/-down register 22 is arranged to provide two output signals, one via conductor 23 corresponding to a register "full" condition and a second via conductor 25 corresponding to a register "zero" condition. The outputs from the conductors 23 and 25 are provided to a by-stable multi-vibrator 26, an output of which is applied via conductor 28 jointly to the multi-channel pulse analyzer 40 and to the "and" gate 20.

In the multi-channel analyzer 40 the pulse height measurement section 41 receives the shaped pulses from the linear shaping amplifier 12 via conductor 17, analyzes, sorts and stores the counts in respective channels of the analyzer. The amplifier 12 receives pulses from the source 30 via conductor 16, shapes an output pulse in accordance with the amplitude of the pulses provided thereto for improving the signal to noise ratio. Thus the amplifier 12 functions as a part of the input section to the analyzer 40.

Also a timing signal is provided to the pulse height measurement section 41 via conductor 49 extending from timing circuit 45 including a clock oscillator 46, and an and gate 47.

The pulse source 30 may, for example, be an X-ray fluorescent spectrometry such as embraced in the Edax International Model 707 X-ray Analyzer System including an X-ray detector 31 positioned adjacent a specimem A which is to be analyzed and which is bombarded by X-rays, for example, from a source 50. The detector may consist of a lithium-drafted silicone semiconductor which, when appropriately biased, develops a charge proportional to the energy of the incident X-ray emitted from the sample A. This charge is integrated into a voltage pulse by a preamplifier 32. The detector 31 and preamplifier 32 are cooled with liquid nitrogen from a dewar 33 which is used to stabilize the detector and to reduce the background noise. The pulse signals from the preamplifier 32 as shown in FIG. 2A are the stream of input data pulses from the pulse source and are applied then to the parallel conductors 16 and 18, the former of which is applied to a linear shaping amplifier 12. Linear shaping amplifier 12 is of a variable gain type but stable over extended periods of time thereby providing means for calibrating the system and accommodating variations in detector efficiency. Thus, the input pulses as shown in FIG. 2A are shaped and provided into the output conductor 17 in the form as shown in FIG. 2B. Some pulses from the preamplifier 32 overlap adjacent pulses and hence are "piled up" in the shaping function.

At the same time, the pulses from the preamplifier 32 applied to the conductor 18 (as shown in FIG. 2A) are applied to a fast discriminator 14 to produce output pulses as shown in FIG. 2C corresponding to the occurrence of the pulses in FIG. 2A. Those pulses are applied to conductor 19 which extend to the and gate 20.

Referring back to the amplified signals on conductor 17 applied to the multi-pulse height analyzer 40, a data gate therein (not shown) allows only those pulses which the system is prepared to analyze to enter the system for analysis. This is because during the time that the system is processing one pulse, it may not have a capacity to process a closely following subsequent pulse and therefore the subsequent pulse will be ignored by the system. However, within the parameters set herein, this does not effect the quantitative analysis of the system, particularly if a correction is made in the pulse height analyzer for the real time that it was active in processing pulses as compared to the total amount of time that it could have been active in analyzing pulses had it had the capacity to do so.

Although it is not critical to the present invention, it is helpful to the understanding of its background if it is understood that within the pulsed height measurement system those signals which are accepted for analyzation are converted to a binary information signal indicative of its magnitude and hence the energy level of the X-ray event detected at the pulse source 31. That information signal is applied to a storage member unit having a large number (typically 400) memory locations, each corresponding to an energy level. A number stored in each of such memory locations indicates the number of X-ray events which have been received for that energy level. In this fashion, it is possible to develop within the 400 memory location a complete energy spectrum for a spectrum being analyzed. As pointed out above, the significance of that analyzation is important only insofar as an accurate measurement of the analyzation time by the multi-channel pulse height analyzer can be made. That live time is also stored in the pulse height measurement section in accordance with oscillations provided from the timing section 45 for the time intervals permitted by the and-/or gate 47. Important here is the understanding that there is an inherent delay in the analyzer of 20 to 100 microseconds to permit measurement, sorting and storing which delay is not constant. Accordingly, there is an output via conductor 24 which indicates the number of events that is processed and analyzed by the multi-channel pulse height analyzer circuit 40 during a given period of time. The output pulses provided via conductor 24 appear as shown in FIG. 2D.

The stream of pulses produced at the discriminator 14 and applied to conductor 19 (as shown in FIG. 2C) is applied to the and gate 20. When the gate 20 is open, all of the incoming pulses via conductor 19 are applied through conductor 21 to the count-up side of the counter register 22. At the same time, the output pulses from the multi-channel pulse height analyzer applied to the conductor (as shown in FIG. 2D) are applied to the count-down side of the up/down counter register 20. Thus, the analyzer output pulses via the conductor 24 are counting down the register at the same time that the register is being counted up by the input pulses provided via conductor 21 through the gate 20. Accordingly, whenever the gate 20 is open, during time periods $t_1$ to $t_2$ and $t_3$ to $t_4$, there is a positive total count in the register 22 which is the subtracted difference between the number of input pulses via the conductor 21 and the number of analyzer output pulses via the conductor 24. That count corresponds then to the effective number of input pulses which were missed in the analyzer during the time period that the counter register 22 was counting up. The counting of missed events is indicated by the steps in FIG. 2E. Missed events are otherwise referred to herein as "lost input pulses" and as "non-processed input data pulses."

When the accumulated total of "missed" events in the counter register 22 reaches a present maximum count capacity of the register 22 then provides an output signal in its "over-flow" output lead 23 to the flip-flop circuit 26. The flip-flop circuit 26 then changes state in response to the over-flow signal to does a zero output signal at its output conductor 28 (as shown in FIG. 2F). Thus, both the and gate 20 and 47 are closed responsive to the over-flow signal from the register 22. As may be seen from FIG. 2G, the closing of the and gate 47 cuts off the output from the oscillator 46 in the timing section and thus there is no timing input to the analyzer as long as the gate 47 is closed. Both of the and gates 20 and 47 remain closed until the register 22 counts down to zero at which time an output signal is placed on the zero detect conductor 25 applied to the flip-flop 26. Thereupon a zero output signal is applied to the output lead 28. However, that does not occur until the counter register has been emptied and has a zero count therein. In FIG. 2, the time period $t_2$ to $t_3$ illustrates the "off period" with FIG. 2G illustrating the output of the oscillator 46 in the multi-channel analyzer 40 and the FIG. 2H illustrating the input via the conductor 21 to the count up-side of the count register 22. Thus, it will be seen that by reference to FIG. 2D, output pulses from the multi-channel pulse height analyzer 40 during the time period $t_2$ to $t_3$ empties the counter register 22 which are the pulses analyzed in the analyzer without a timing signal input. When the counter register 22 reaches zero at time $t_3$ the flip-flop 26 flips and the and gates 20 and 47 are reopened and the initially described conditions repeat. Specifically, the register begins to count up again by the difference between the input pulses via conductor 19 and the measured events via conductor 24, and the timing signal input is restored to the analyzer.

By the reference to the foregoing, it may be seen from FIG. 2 that the cyclic opening and closing of the and gate 47 in the timing section 45 to define one complete timer cycle is controlled by the cyclic counting up and down of the register 22. It may also be seen that this time period of the closing off of the and gate 47 (time $t_2$ to $t_3$) is the time period needed to count the register down by the number of "missed events" it has stored in counting up. In this way the information measured by the analyzer 40 is accurately corrected for all loss of events due to the finite time period required to measure each event. This is based on the assumption that without a change in conditions the input pulses during the count down of the register will come in at approximately the same rate as during the count up. The off period $t_2$ to $t_3$ or $t_4$ to $t_5$ are not necessarily equal to the on periods $t_1$ to $t_2$ or $t_3$ to $t_4$, and none of the off periods or on periods are necessarily equal or time related. As a matter of practice, for low counting rates, the on period during a timer cycle will tend to be longer than the off cycle whereas for high counting rates the on period during a timer cycle will tend to be shorter than of off cycle. In the system employed in the present invention, where for example the time analysis period (the recorded "live" time of the analyzer) is 100 seconds, where the input count rate variation is from 0 to 30,000 input pulses per second, and where the storage count capacity in the counter register 22 is approximately 200, it has been found that the information data from the analyzer is accurate to within 0.3 of one percent. This data was obtained with a typical X-ray system with 40 microsecond pulses out of the shaping amplifier. The use of shorter time constants, typical of the gamma ray field, will yield higher count rate capability.

Although the invention is believed to be completely described by the foregoing, another way of looking at the circuit function is by reference to FIG. 2 where it may be seen that the timing pulse input (FIG. 2G) in the analyzer is shut down periodically for a period of time sufficient to allow the output of the analyzer to catch up with the number of input pulses that had been applied (FIG. 2B) to the analyzer. This "catching up" is very accurate where the spectral distribution does not change appreciably during one complete timer cycle, because the number of missed events, which is the number counted by the register counter 22 and which caused the register to close, maintains the register closed until all of the missed events have been accounted for in the counting down of the register. In effect the events missed during a time period are actually accounted for in the analyzer during a "shut down" and not just statistically corrected for.

The amplifier, discriminator, register, oscillator, flip-flops, gate circuits, as well as preamplifiers may be of any standard kind such as well known to those in practice of the art and the implementation of such circuitry is well within the means of those having normal skills in the electronics art. It is meant to cover herein all such variations and modifications of the invention as would be obvious to those having reasonable skills in the art.

What is claimed is:

1. In a system including an analyzer for analyzing a stream of input data pulses from a pulse source wherein the analyzer requires a finite time period for the analysis of the input data pulses and provides an output pulse corresponding to the completion of each analysis, which finite time period overlaps in real time one or more adjacent input data pulses so that the analyzer provides an output pulse corresponding to only a portion of said input pulses and where the analyzer has a clock means providing a real time correlation input to said analyzer means, the improvement of an accurate live time correction circuit comprising:

a gate means,
   an up/down counter register for counting pulses from zero up to a pre-set maximum count capacity,
   said up/down register being connected to the pulse source through said gate means for counting up for each of the input data pulses from the pulse source and being connected to the analyzer for receiving and simultaneously counting down for each of the output pulses from the analyzer, so that the count normally in said register is the subtracted difference between the total count of the input data pulses from the pulse source and the total count of the output pulses from the analyzer,
   and switch means operatively connecting said register to the clock means and also to said gate means,
said switch means being operative between a closed condition in response to said register reaching said pre-set maximum count capacity of said register and an opened condition in response to said register reaching zero,
said switch means, in said closed condition, switching off both the clock means input to the analyzer and said gate means for the time period extending between the time said pre-set maximum count capacity of said register is reached and the time said register is counted down to zero; whereby counts to said register corresponding to input data pulses are interrupted and said register is counted down to zero by the output pulses from said analyzer, and the time periods in which said switch means is closed providing accurate time correction adjustment for the difference between the number of the input data pulses from the pulse source and the number of output pulses from the analyzer.

2. The live time correction circuit set forth in claim 1 further including a discriminator disposed between the pulse source and gate means for providing an intelligible count signal to said gate corresponding to each of the input data pulses in the stream of input data pulses.

* * * * *

UNITED STATES PATENT OFFICE
CERTIFICATE OF CORRECTION

PATENT NO. : 3,896,296
DATED : July 22, 1975
INVENTOR(S) : Morris W. Barnhart

It is certified that error appears in the above—identified patent and that said Letters Patent are hereby corrected as shown below:

Column 5, line 16, "does" should be --provide--.

Signed and Sealed this twentieth Day of April 1976

[SEAL]

Attest:

RUTH C. MASON
Attesting Officer

C. MARSHALL DANN
Commissioner of Patents and Trademarks